Dec. 30, 1952

J. M. SLATER

2,623,714

AUTOMATIC FLIGHT CONTROL SYSTEM

Filed Dec. 1, 1948

INVENTOR
JOHN M. SLATER
BY
Herbert P. Thompson
ATTORNEY.

Dec. 30, 1952 J. M. SLATER 2,623,714
AUTOMATIC FLIGHT CONTROL SYSTEM
Filed Dec. 1, 1948 3 Sheets-Sheet 3

INVENTOR
JOHN M. SLATER
BY
Herbert B. Thompson
ATTORNEY

Patented Dec. 30, 1952

2,623,714

UNITED STATES PATENT OFFICE 2,623,714

AUTOMATIC FLIGHT CONTROL SYSTEM

John M. Slater, Inglewood, Calif., assignor to The Sperry Corporation, Great Neck, N. Y., a corporation of Delaware Application December 1, 1948, Serial No. 62,836

20 Claims. (Cl. 244—77)

This invention relates generally to automatic pilots for aircraft or missiles and has reference, more particularly, to an automatic pilot system which supplies control moments for entering and maintaining a craft on a predetermined course, be that course straight and level or very complex in pattern.

The auto pilot of the present invention makes use of inertial devices such as torqued gyros, rate gyros, angular accelerometers or any other device which makes use of Newton's second law to detect angular movements or rate of movement, which are mounted on the three major craft axes and move therewith and are kept under continuous control from earth references during all maneuvers; thereby deriving an accurate attitude reference with respect to the earth.

In general, auto pilots in the past ordinarily have made use of displacement gyros such as vertical gyros and directional gyros for giving signals to the craft control surfaces which enter and maintain the craft on a predetermined course. In this type of automatic pilot there is the undesirable problem of gimbal lock, especially in the use of a gyro vertical. Also the use of a vertical gyro and directional gyro entail very sensitive and thus very accurately machined elements which make such a pilot very cumbersome and expensive. However, in the auto pilot of the present invention there is no gyro vertical or directional gyro employed. In place of the gyro vertical there is provided a support or platform which is journaled for rotation about the pitch and roll axes of the aircraft and is moved equally and oppositely to movements demanded of the craft. On this support are placed earth reference devices, which may be a pendulum or pendulums, liquid levels, a gyro pendulum, or other suitable gravity sensitive device, sensitive to tilt about the pitch and roll axes of the craft. Thus, there is provided a pitch and roll reference apparatus which supplies to the auto pilot of the present invention the two earth-based quantities, angle of bank and angle of elevation. However, in the use of gravity sensitive devices, there arises the problem of centripetal and longitudinal accelerations which are present when the craft departs from a predetermined straight and level course as during turns or during prolonged changes of speed of the craft, such as are present during the takeoff and the approach periods. These accelerations are compensated so that the pendulums will give a representation of the true vertical with respect to the earth.

The support also carries an azimuth reference to supply the third earth-based quantity, heading, which may be in the form of a compass card mounted on the support and driven from the output of a flux valve or other earth's magnetic field direction indicating device.

The present invention is an improvement over the auto pilot disclosed in my copending application joint with Walter Wrigley, Serial No. 734,922, filed March 15, 1947, for Flight Control Systems. The general mathematical theory upon which the present invention is based is fully disclosed in this application, and need not be discussed in detail with respect to this case.

In the auto pilot of the present invention there is provided a control handle or control member operated by the aviator for entering the craft on a predetermined flight maneuver. Signals produced by the apparatus associated with the control handle are employed to operate the craft control surfaces through aircraft reference gyros or rate gyros sensitive to torques produced by the control signals and their respective servomotors. At the same time the control signals are also employed to tilt the pitch and roll reference apparatus equally and oppositely to the movement of the craft produced by the control surfaces. Essentially, the auto pilot system has two servo loops, one of the servo loops connecting the control handle and the pitch and roll reference apparatus. The two loops are so correlated and arranged that a signal in the first loop will move the craft in one direction or the other and at the same time a signal in the second loop will move the pitch and roll reference apparatus in a direction equal and opposite to the movement of the craft. For example, if the aviator desires to climb, he pulls the control handle backwards. By this movement a signal is produced in the first loop which applies a torque to the pitch reference gyro which in turn sends an integrated version of the signal to the pitch servomotor through the action of the pitch gyro. The servomotor moves the elevators of the craft to change the angle of elevation in accordance with the movement of the control handle. However, at the same time a signal is produced in the second servo loop which is so correlated as to tilt the pitch and roll reference apparatus forwardly through the appropriate servomotor acting on the pitch axis of the pitch and roll reference apparatus. The amount of forward rotation of the pitch and roll reference apparatus is in proportion to the angle of elevation of the craft, the proportion being so chosen as to leave the pitch and roll reference apparatus in a substantially level plane with respect to the earth. If, however, there is any residual error in the system, the pitch pendulum gradually corrects this error.

The auto pilot system is arranged to control the craft in bank in a similar manner. In the case of a bank, the aviator moves the stick to the right or left depending on the desired direction of the turn to produce a control signal in the first servo loop to torque the roll reference gyro in proportion to movement of the stick. The signal producing means associated with the roll gyro sends an integrated version of the signal to the aileron servomotor which moves the aileron surfaces to move the craft to a banked attitude. At the same time a signal is produced in the second servo loop which tilts the pitch and roll reference apparatus to the right or left in proportion to the movement of the control handle, through an appropriate servo motor. The direction of rotation of the pitch and roll reference apparatus is opposite to the bank angle set in by the control handle. Therefore, if the craft is banked to the right, the pitch and roll reference apparatus will be rotated to the left, the movement being so correlated that the pitch and roll reference apparatus will remain in a substantially level position with respect to the earth. Again, use is made of a roll pendulum which gradually wipes out any residual errors arising in the system. A computer is provided to calculate the proper rate of turn for the bank angle set in by the control handle in the same manner as that shown in the above-mentioned joint application. The rate of turn signal is also applied to appropriate apportioners which divides the computed rate of turn signal between the pitch, roll and yaw gyros.

It is to be understood that in automatic pilots which employ torqued or rate gyros to supply control moments about the primary craft axes as disclosed in the above-mentioned joint application, it is necessary to apportion the control signals thereto in a ratio dependent upon the angle of bank, angle of elevation, and rate of turn of the craft. In doing this, the gyros will be maintained in a null position during a properly coordinated maneuver.

In the auto pilot of the present invention, the use of a compensated gravity reference to derive a level reference has been stated. This may conveniently taken the form of the compensated gyro pendulum disclosed in copending application, Serial No. 705,878, filed October 26, 1946, in the name of Spencer Kellogg, 2nd, for Instruments for Providing a Vertical Reference for Dirigible Craft, said application maturing into U. S. Patent No. 2,595,268 on May 6, 1952. A pendulum of this type is especially adapted to the present invention because such a pendulum is corrected for centripetal and longitudinal accelerations. It is also possible, if desired, to correct for the acceleration due to Coriolis. The only disturbance that a gyro pendulum of this character is subject to is that due to gusts of wind, or shifts of the center of gravity of the aircraft, or other short period disturbances, and these may be greatly reduced by heavy damping as by use of damping torquers as described in the Kellogg application above-mentioned or by immersion in oil or other suitable viscous liquid.

The principal feature of the present invention is to provide an automatic pilot in which the use of a gyro vertical and directional gyro to give a vertical and directional reference has been eliminated.

Another feature of the present invention is to provide a non-gyroscopic level reference whereby the problem of gimbal lock during complex maneuvers is avoided.

An object of the present invention is to provide an auto pilot which makes use of aircraft reference gyroscopes sensitive to movement about the three primary craft axes and kept under continuous control from earth references during maneuvers.

Still another object of the present invention is to provide an automatic pilot which provides a universally movable support with earth references mounted thereon for providing earth-based quantities, angle of bank, angle of elevation and heading and including means for moving the support in a direction equal and opposite to the movements demanded of the aircraft.

Another object resides in the provision of an automatic pilot comprising two servo loops, one connected to move the aircraft control surfaces through rate gyros with feed back through the aircraft and the other connected to move the support equally and oppositely to movement of the aircraft with feed back in the servo loop.

Another object resides in the use of a pair of compensated pendulums mounted on a universally movable support to establish a level reference and using signals from the pendulums to keep the craft on a predetermined level course.

A still further object of the present invention resides in the use of a gyroscopic pendulum mounted upon a universally journaled support to establish a level reference.

Still another object of the present invention resides in the provision of a braking device on the control handle which limits the movement thereof to an amount to which the aircraft can respond.

Another object of the invention is the provision of a stabilized rate of turn gyro which gives an indication equal to the azimuthal rate of turn of the craft.

A still further object is to provide an automatic flight control system having a displacement type manual control wherein the control handle generates signals proportional to the rate of movement thereof, which are integrated by the craft reference gyros and aircraft to give a craft displacement equal to the integrated signals.

Other objects and advantages not at this time more particularly enumerated, will be clearly understood from the following detailed description of the same when taken in connection with the accompanying drawings, wherein.

Figure 1:
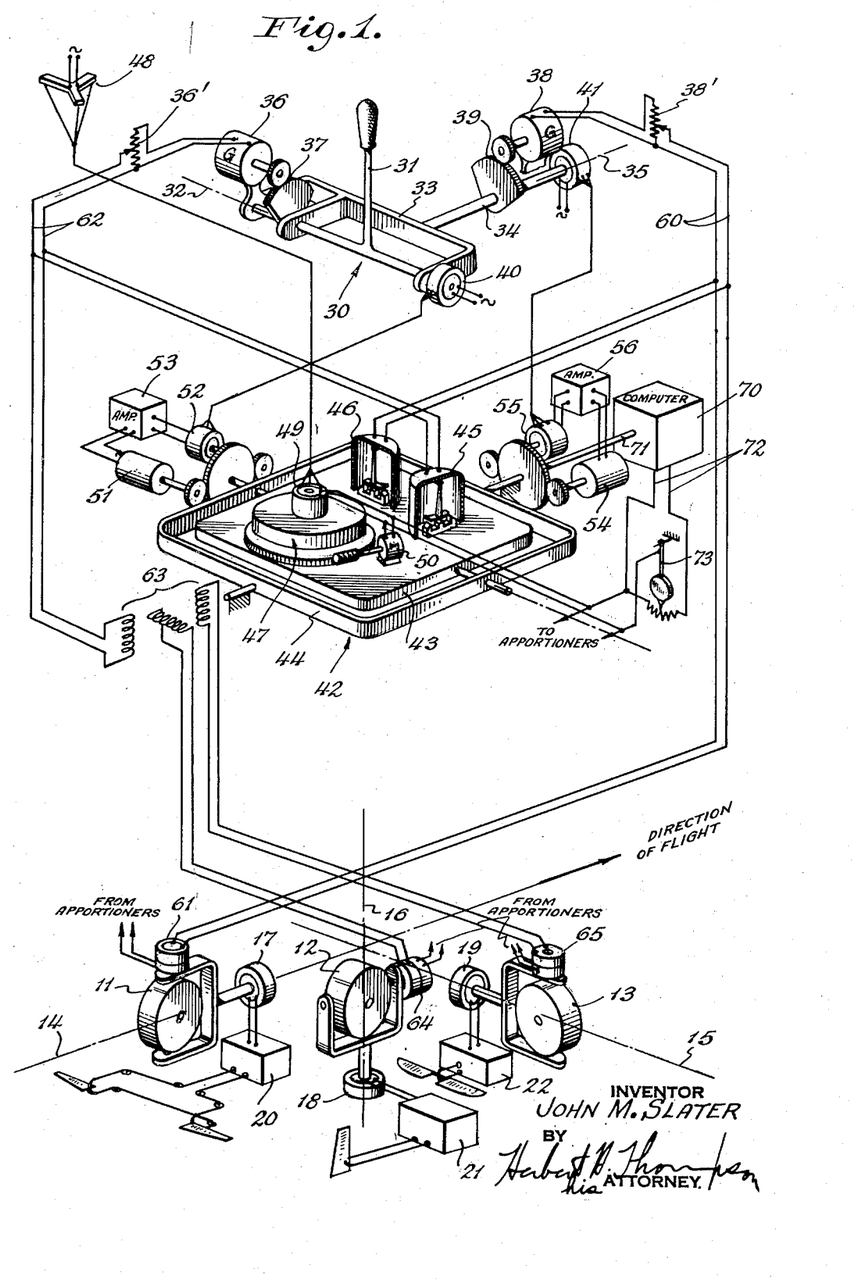
Fig. 1 is a schematic diagram showing a preferred form of the invention.
Figure 4:
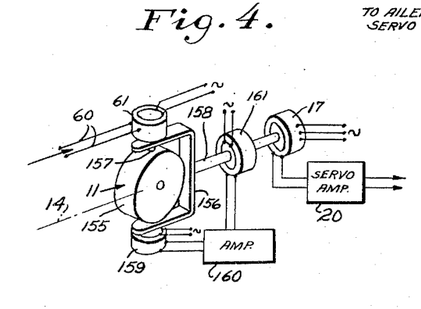
Fig. 4 is a schematic representation of a torqued gyro which may be employed in the present invention.

Referring now to the drawings, Fig. 1 shows an embodiment of the present invention wherein the airplane is controlled by three conventional aircraft reference gyros or torqued gyros 11, 12 and 13, which may be of the type disclosed in the above-mentioned application of Slater and Wrigley or any other suitable inertial device. The roll gyro 11 is mounted on a fore and aft axis 14 and is responsive to rolling of the craft. Similarly, the pitch gyro 13 is mounted on an athwartship or transverse axis 15 and is responsive to movement of the craft in pitch. The yaw gyro 12, which is responsive to turning movement of the craft, is mounted on vertical axis 16. The gyros 11, 12 and 13 have suitable signal producing devices 17, 18 and 19, respectively, for supplying voltages to three respective servo amplifiers, and servomotors 20, 21, and 22 which move the aircraft control surfaces. The torqued gyros are also provided with pick-off and torquer means which maintain the spin axis of the gyros in a plane at right angles to the plane of the gimbal member in a well known manner. For example, in Fig. 4 there is illustrated a conventional torqued gyro which may be employed in various of the embodiments of the present invention. For example, gyros 11, 12 and 13 of Fig. 1, as well as all of the torqued gyros referred to herein, may be torqued gyros of the character illustrated in Fig. 4. For purposes of illustration there is shown and described the gyro of Fig. 4 as employed as gyro 11 in the system of Fig. 1 and controlling the craft ailerons through pick-off device 17 and the amplifier and servomotor 20. This torqued gyro is sensitive to movements of the craft about the roll axis thereof and comprises, generally, a rotor case 155 having a rotor journaled therein for spinning about an axis normal to the sensitive axis 14. Rotor case 155 is journaled for pivotal movement in a normally vertical gimbal ring 156 as by shaft 157. Gimbal 156 is, in turn, pivotally supported to rotate about the fore and aft axis 14 of the craft by shaft 158 journaled in suitable bearings, not shown. A torque motor 61 has its field fixedly supported on gimbal 156 and is excited by the rate signal from the generator 38 of Fig. 1. The rotor of torque motor 61 is fixed to shaft 157 on rotor case 155 and produces a torque on case 155 which is proportional to the magnitude of the voltage in the field thereof. The torque produced by torque motor 61 will cause precession of the gyro in one direction or the other, depending upon the direction (polarity or phase sense) of the rate signal from generator 38, to thereby cause relative displacement between the stator and rotor of the signal generator 17. The field of signal generator 17 is excited from a suitable source of voltage and is fixed to the craft, its rotor being secured to shaft 158 on gyro gimbal 156 and adapted to produce a signal proportional to the angular displacement thereof relative to the field caused by precession of the gyro. This signal is supplied to the servo amplifier and servomotor 20 which drive the ailerons. The means for maintaining the spin axis of the rotor perpendicular to the plane defined by gimbal 156 comprises a pick-off 159 having its stator fixed to gimbal 156 and the rotor thereof fixed to rotor case 155. The rotor is supplied from a suitable source of voltage and relative movement of the rotor and field will produce a signal voltage which is amplified in a suitable amplifier 160, the output of which controls the field of a torque motor 161 secured to the instrument casing or craft. The rotor of torque motor 161 is fixed to shaft 158 of gimbal ring 156. Therefore, precessional movements of the rotor case 155 due to rotation of the craft about the axis 14 will produce a signal at 159 which is amplified at 160 to produce a corresponding erecting torque on the gimbal 156 through torque motor 161. It will be seen, then, that the pick-off 159, amplifier 160, and torque motor 161 together form a resilient coupling between said rotor case 155 and gimbal 156 which is analogous to a spring connected between the two members, as in a rate of turn gyro.

The manual control for the present embodiment is shown generally at 30 and comprises a control handle 31 which is mounted for rotation about a transverse or athwartship axis 32. A U-shaped member 33, in which control handle 31 is mounted is provided with a shaft 34 mounted for rotation about a fore and aft axis 35. The manual control handle is arranged as shown so that movement of the handle forwardly or backwardly drives a generator 36 through sector and gear 37, and movement to the right or left drives a generator 38 through sector gear 39. Manual control handle 31 also has associated therewith a pair of synchro transmitters 40 and 41, the stators of which are fixed relative to member 33 and the aircraft respectively and the rotors thereof being positioned by control handle 31. The output of synchros 40 and 41 is utilized to position a pitch and roll reference apparatus which supplies the three earth-based quantities, angle of pitch, angle of roll, and heading, to be hereinafter described.

The pitch and roll reference apparatus is indicated generally at 42 and comprises a support member or platform 43 mounted for universal movement in a gimbal ring 44. Support 43 carries a pair of compensated pendulums 45 and 46 mounted in such a manner as to be responsive to movement of the support in pitch and roll. An azimuth reference is also provided in the form of a compass card 47 mounted for rotation about a vertical axis on the support 43. Compass card 47 is positioned in azimuth by the output of a flux valve or other earth's field detection device 48 through synchro 49 and a compass card drive motor 50. Support member 43 is positioned in pitch by a pitch servomotor 51 the rotation of which is controlled by the output of synchro receiver 52 associated with synchro transmitters 40 through a conventional servo amplifier 53. Similarly, support members 43 is positioned in roll by a roll servomotor 54 controlled from the output of synchro receiver 55 associated with synchro transmitters 41 through a servo amplifier 56. Motors 51 and 54 will operate until the output appearing in synchros 52 and 55 has been reduced to zero in a well-known manner. The generators 36 and 38 and servo amplifiers and servo motors 20, 21 and 22, form a first servo loop adapted to move the craft about its primary axes in accordance with the movement of control handle 31. Similarly, the synchro transmitters 40 and 41 and servomotors 51 and 54, and associated servo amplifiers 53 and 56 all comprise a second servo loop. The second servo loop connects the control handle 31 with the pitch and roll reference apparatus 42 and any movement of the handle 31 will produce a proportional movement of the pitch and roll reference apparatus 42 to be hereinafter described. Movement of the pitch and roll reference apparatus then provides a direct measure of the three earth-based quantities, angle of bank about the axis 14, angle of elevation about axis 15, and heading about axis 16.

The generators 36 and 38 may be small P. M. generators or other suitable rate generators which produce voltages which, in magnitude, depend upon the speed or rate at which the rotors are driven relative to the fields thereof. Therefore, upon movement of the control handle 31 forwardly or backwardly, a voltage is produced by generator 36 which is proportional to the rate of movement of the control handle and similarly, upon movement to the left or right there is produced by generator 38, a voltage proportional to the rate of said movement. A pair of variable resistances 36' and 38' are inserted across the outputs of the generators 36 and 38 respectively and are adjusted in such a manner that the generator outputs will be in such proportion to the angular momentum of the control gyros that the craft will respond accurately to the rate of movement of the control handle 31. The voltage derived from generator 38 by rotation of handle 31 is proportional to the rate of rotational movement and is applied to the roll gyro 11 through leads 60 and torquer 61 which causes precession of the gyroscope 11 thereby producing an integrated version of the generator signal at 17 which is applied to the aileron servo amplifier and servomotor 20 to position the ailerons of the craft in proportion to movement of handle 31. In the same manner, the generator 36 produces a voltage proportional to the rate of movement of the control handle 31 forwardly or backwardly and is applied to leads 62. The voltage in leads 62 is divided by a cross-controller 63, which divides the generator signal between torquers 64 and 65 on the yaw gyro 12 and the pitch gyro 13, respectively, in a ratio depending on the bank angle of the craft. Signal producing devices 18 and 19 produce an integrated version of the generator signal which is applied to the servo amplifiers and said servo motors 21 and 22 respectively, which move the rudder and elevators in accordance with movement of the control handle 31. It will be noted then that the sequence of operation between control handle 31 and servomotors 20, 21 and 22 is as follows: (1) angular displacement, $a$, of control handle 31, (2) first time derivative of angular displacement, $$\frac{da}{dt}$$

by generators 36 and 38, and (3) integration by the aircraft reference gyros and aircraft of the first time derivative, $$k\int\frac{da}{dt}$$

to produce an aircraft angular displacement $\theta$; or $(a)$, $$\left(\frac{da}{dt}\right), \left(\theta = k\int\frac{da}{dt}\right)$$

Simultaneously, movement of the control handle 31 to the right or left produces a signal in the field of synchro transmitter 41 which is reflected in the field of synchro receiver 55 thereby producing a voltage in its rotor proportional to the displacement of the handle 31. This signal is amplified in amplifier 56, the output of which drives motor 54 which rotates the support 43 until the signal in 55 has been reduced to zero. The servo loop comprising synchros 41 and 55, amplifier 56, and motor 54 is so adjusted that the motor 54 will drive support 43 in amount equal to the displacement of the control handle 31 but in an opposite sense. For example, movement of the handle 31 to the right say 10° will cause the craft to bank to the right to an angle of 10° through the first servo loop, but at the same time the support 43 will be tilted to the left in an equal amount, that is 10°, thereby maintaining the support 43 in a level, horizontal plane with respect to earth. If, however, there is any residual error in the system, it will be slowly erased by a signal from roll pendulum 46. This signal will be applied to the torquer 61 on the rate of roll gyro 17 and correct the crank bank angle so as to erase the error.

Upon movement of the control handle 31 forwardly or backwardly, there is produced in the field of synchro transmitter 40 a signal which is reflected in the field of synchro receiver 52 thereby producing a voltage proportional to the displacement of control handle 31 in the rotor of the synchro 52 which is amplified in amplifier 53. The output of the amplifier drives motor 51 which positions the support 43 in proportion to the forward or backward displacement of the control handle 31. For example, movement of the control handle 31 backwardly will cause the craft to climb at a predetermined angle of elevation, say 5°, but the signal to the motor 51 from the transmitter 40 will be in a direction equal and opposite to the amount of movement of the control handle 31 and therefore the platform 43 will be maintained level. Any residual error in the system will be corrected by the pitch pendulum 45 which applies a signal to gyros 12 and 13 depending on the bank angle, to increase or decrease the angle of elevation of the craft until the signal from pitch pendulum 45 is zeroed. It will be seen from the foregoing that the support 43 provides a measure of the earth-based quantities, angle of pitch, angle of roll, and heading.

So far in the description of the present invention only the means for banking and pitching the craft have been discussed. However, in the present application, the angle of bank is selected or predetermined by movement of the control handle, but at the same time the proper rate of turn is computed for that predetermined bank angle. The apparatus for performing this operation will now be described. Motor 54 as described above rotates the support 43 in a direction equal and opposite to the rotation of handle 31. The rotation of the support provides the input to a computer 70 through a continuation 71 of the gimbal bearing shaft. Computer 70 computes a rate of turn appropriate for the bank angle set in by handle 31 and is essentially identical with that shown in the above-mentioned joint application and need not be described in detail in the present application. The output of the computer is a voltage appearing on leads 72 which is proportional to the computed rate of turn in azimuth of the craft. This voltage is applied to apportioners (not shown) on each of the support axes of rotation which divide the rate of turn signal between the three torqued gyros 11, 12 and 13 for reasons described in the above-mentioned joint application. However, since these circuits are shown in detail therein they have been omitted in the present application for the sake of clarity. A side slip detector 73, in the form of a pendulum, is provided to insure that the craft is in the proper rate of turn for the predetermined bank angle.

The voltage proportional to the rate of turn appearing on leads 72 is also employed to drive compass card drive motor 50 mounted on the support 43 which drives the compass card 47 at the computed rate of turn. If, however, when straight flight is resumed, there is any residual error, flux valve 48 will correct it.

Figure 2:
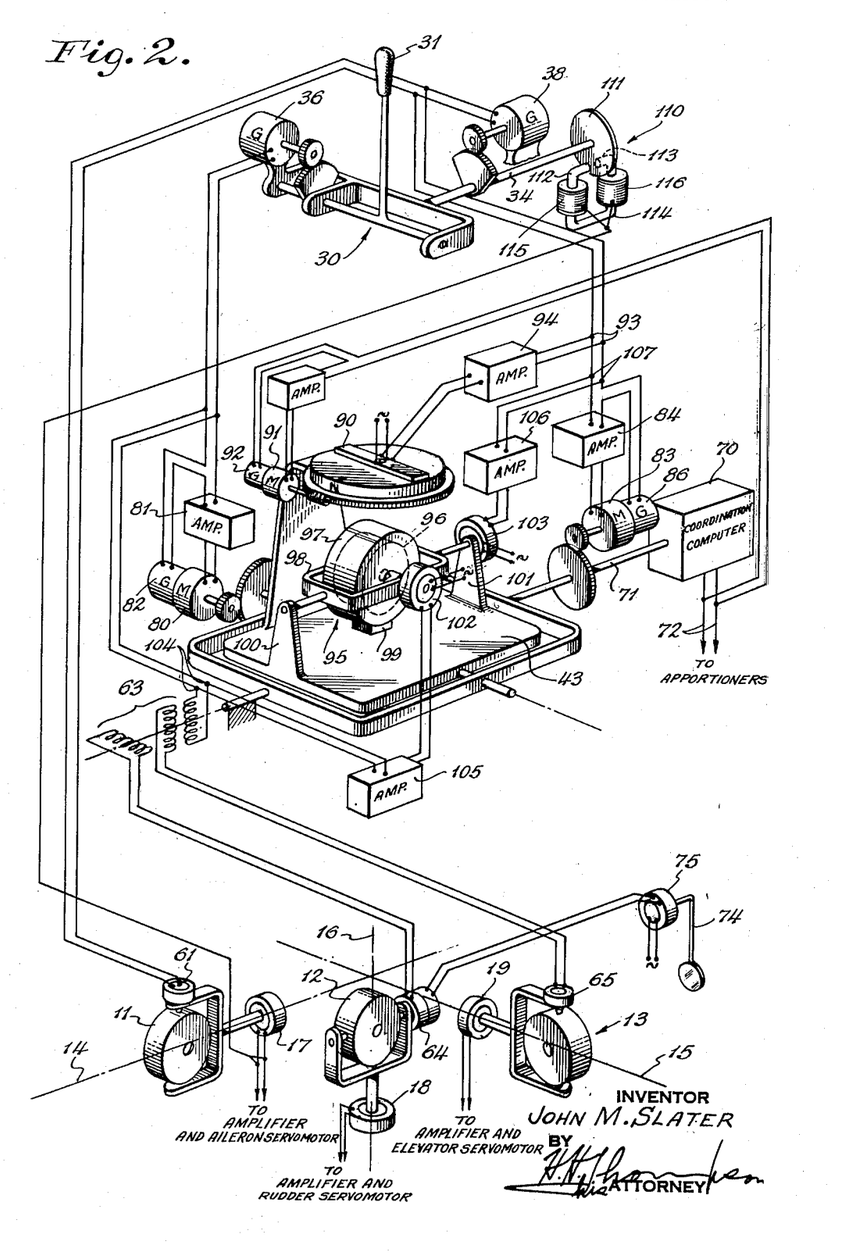
Figure 2 is a diagram similar to Fig. 1 showing a modification of the system.

There is illustrated in Fig. 2 another embodiment of the present invention. The main feature of this embodiment is the provision of a gyroscopic pendulum replacing the pendulums of Fig. 1. As stated above, the gyroscopic pendulum best adapted to this system is shown in the above-mentioned co-pending application, Serial No. 705,878, now U. S. Patent No. 2,595,268. As stated, this pendulum apparatus is particularly adaptable to the present system because it is compensated for centripetal and longitudinal accelerations.

The system as shown in Fig. 2 is similar to that shown in Fig. 1, and therefore the same reference characters will be applied to the same or similar elements as used therein.

In Fig. 2, as in Fig. 1, control handle 31 is universally mounted for rotation about the primary craft axes to produce control signals for moving the craft upon a desired course. Movement of the control handle 31 forwardly or rearwardly produces a signal in generator 36 proportional to the rate of movement of the handle through sector and gear 37. This signal produced by generator 36 is applied through cross controller 63 to the pitch and yaw gyros in a proportion dependent on the bank angle of the craft. At the same time the signal is applied to drive motor 80 after amplification by a suitable amplifier 81 to cause a rotation of the support 43 about an athwartship axis, the amount of rotation being equal and opposite to the movement of the craft through the control gyros. A speed generator 82 is provided to produce a feedback signal to amplifier 81 to insure that the motor speed is accurately proportional to the applied voltage. The motor 80 integrates the signal from generator 36 and drives the support 43 in a sense opposite to the movement of the craft as above described; that is, opposite to the desired angle of elevation. Therefore, as the airplane follows the gyro signals, the support will remain in a level position.

Similarly, upon movement of the control handle 31 to the right or left, a signal will be produced in the generator 38 which is proportional to the rate of movement of the control stick and is applied to the rate of roll gyro 11, as in Fig. 1. At the same time, the signal from generator 38 drives a motor 83 through amplifier 84 to tilt the platform 43 about the fore and aft axis through gimbal bearing shaft 71. As above, a speed generator 86 is provided to insure that the motor speed is accurately proportional to the signal from the generator 38.

Bearing shaft 71 operates computer 70 which may be the same as that described in Fig. 1 to compute an appropriate rate of turn for the selected bank angle applied by control handle 31. The computed rate of turn signal is apportioned among the three gyros 11, 12 and 13 as a function of the angle of bank and angle of elevation as derived from the axes of rotation of the support 43, these circuits again being omitted from the drawing for the sake of clarity. In the modification shown in Fig. 2 the correction for side slip as applied to torquer 64 on the rudder gyro 12 by means of a pendulum 74 operating a signal transformer 75.

The direction reference of the modification of Fig. 2 is shown as a null type flux valve 90. The rate of turn signal appearing in leads 72 from computer 70 is applied to motor 91 to drive flux valve 90 and compass card 92 mounted on the support 43 at a speed equal and opposite the rate of turn of the craft. A speed generator 92 is again employed to insure that the motor speed will cause the compass card to accurately follow the rate of turn signal from computer 70. If the computed rate of turn is correct, the flux valve will be stabilized in azimuth being driven equal and oppositely to the movement of the craft. However, if the computed rate of turn is not identical to the actual rate of turn, an error signal will appear from the flux valve which is applied at points 93 through an amplifier 94, to bank the aircraft more or less to thereby modify its rate of turn. If during straight and level flight the rate of yaw gyro 12 drifts, a signal will be produced by the flux valve 90 which will turn the airplane back toward its course.

In the present modification, the gravity reference is shown as a gyro pendulum 95 mounted on the support member 43. As disclosed in the above-mentioned Kellogg application, the gyro pendulum comprises a rate of turn or two degrees of freedom type of gyro which utilizes the precessional force of the gyro to compensate for centrifugal accelerations acting on the pendulous factor of the gyro pendulum which are present whenever the craft in which it is mounted turns. In the type of gyro pendulum shown compensation for accelerations along the direction of flight of the craft such as those due to changes of speed of the craft is accomplished by changing the angular momentum of the gyro rotor in proportion to air speed, this change causing a reactive torque on the rotor case which, assuming proper direction of rotation of the rotor, prevents the pendulous mass affixed thereto from moving about the athwartship axis of the craft.

As shown in Fig. 2, gyro pendulum 95 comprises a rotor 96 mounted to spin about a normally horizontal athwartship axis in a rotor case 97. Rotor case 97 is in turn pivotally mounted for movement about the same athwartship axis in a gimbal ring 98. Pendulosity of the rotor case 97 is provided by a mass 99 fixed to the bottom thereof. Brackets 100 and 101 forming a part of the platform 43 are provided to enable the gimbal ring 98 to be pivotally mounted therein for rotation about a fore and aft axis.

Signal generators 102 and 103 are provided to produce signals to correct the craft angle of bank and angle of elevation if residual error in computations occur. Any error in the predetermined angle of elevation of the craft as set in by handle 31, will cause a signal to be produced in signal transformer 102 and apply it at points 104 to the cross controller 63 through amplifier 105, which causes the craft to assume the proper angle of elevation through pitch and yaw torqued gyros 12 and 13. Similarly, any error in craft angle of bank will appear in signal transformer 103, the output of which is amplified in amplifier 106 and applied to rate of bank gyro 11 at points 107.

The type of gyro pendulum shown is well suited for long period control but will be affected by short period disturbances such as gusts of wind etc., as mentioned above. However, this may be overcome by immersion in a viscous fluid as described above or damping may be accomplished by providing torque motors on the gyro axis (not shown) which are controlled by a differential of the signal from the two signal transformers 102 and 103 as fully described in the above-mentioned Kellogg application.

In the automatic pilot system of this invention, it may be desirable to limit the rate of movement of the control handle in relation to the speed at which the aircraft can follow the signals produced by the aircraft reference gyros 11, 12 and 13. For example, if the maximum rolling rate of the aircraft is 60° per second, the rate of control handle movement might well be limited to a value such that the platform 43 cannot be moved faster than 60° per second. For accomplishing this desirable feature there is provided a braking apparatus which applies a force about the axis of movement of the control handle so that the operator cannot move the control handle beyond a certain maximum rate. This braking mechanism, of course, is applied to both axes of movement of the control handle, one being omitted from the drawings for the sake of clarity, and the other shown as being applied to the fore and aft axes of movement of the aircraft.

The amplitude of the signals in the pick-offs of the aircraft reference gyros 11, 12 and 13 is a measure of the lag of the aircraft relative to the reference gyros. Therefore, by applying these signals to the brake there would be provided a braking force which is proportional to the lag of the aircraft. To accomplish this, there is shown an eddy current braking device 110 which comprises disc 111 fixed to the shaft 34 of the control handle 30. Disc 111 is positioned to rotate between opposite poles 112 and 113 of an electromagnet 114. The signal in the output of the pick-off 17 of the reference gyro 11 is then applied to separately excite coils 115 and 116 on the respective legs 112 and 113 on the electromagnet 114. In operation then, the signal produced by pick-off 17 will be applied to the electromagnet 114 to cause a heavily concentrated magnetic field between the poles 112 and 113 of electromagnet 114, thereby inducing in the disc 111 strong eddy currents which tend to hold the disc 111 stationary between the field poles 112, 113. However, there being no mechanical connection between the disc and field pole, movement of the control handle 31 will be opposed in an amount proportional to the signal in the pick-off output 17.

Figure 3:
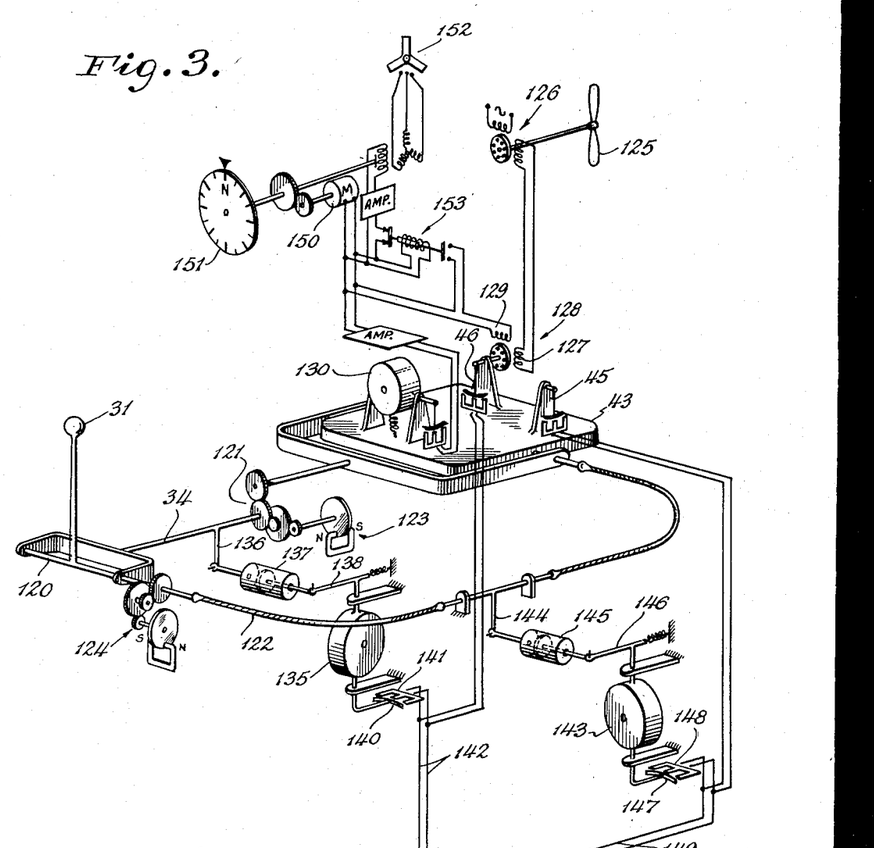
Fig. 3 is a simplified modification of the auto pilot system shown in Figs. 1 and 2.

The automatic flight control apparatus illustrated in Fig. 3 of the drawings is a simplified modification of that shown in Figs. 1 and 2. This system is especially adaptable to small aircraft, particularly aircraft of the two-control type wherein the rudder and aileron are interlocked or even those in which no rudder is used at all. An example of this type of aircraft is the Ercoupe. In this modification the control handle is arranged to tilt the platform directly in an equal and opposite manner. For this purpose there is shown a control handle 31 which is adapted to rotate shafts 34 and 120 depending on the direction of movement thereof. Rotation of shaft 34 in one direction produces a rotation of the platform 43 in an opposite direction through gears 121. Similarly, rotation of the shaft 120 produces a rotation of the platform 43 in an opposite direction through flexible shaft 122. Eddy current braking means 123 and 124 are provided to limit the movement of the control handle 31 to a speed at which the aircraft is able to respond, just as in the case of Fig. 2.

Platform 43 carries a roll pendulum 46 which is compensated for centripetal acceleration by having a torque applied thereto which is proportional to the rate of turn times the velocity of the craft. Thus, there is provided a true air speed meter in the form of a propeller 125 which is adapted to drive a generator 126 such that the voltage generated thereby is proportional to true air speed. This voltage then constitutes the excitation of one phase 127 of a two-phase torquer 128 on a pendulum axis. The other phase 129 of the two-phase torquer is excited by a signal from a rate of turn gyro 130 mounted on the stabilized platform 43 so that it measures azimuthal rate of turn. Also mounted on the platform 43 is a pitch pendulum 45. Pendulum 45 may be compensated for longitudinal acceleration if desired by applying a differentiated version of the velocity signal produced by generator 126 and applied to a torquer on the pendulum axis. However, this may be an unnecessary refinement and has been omitted from the drawings for the sake of clarity.

To make a turn, the control handle 31 is moved to the right or left, depending on the direction of turn desired, which tilts the platform 43 to the left or right respectively, and at the same time applies a torque to a rate of roll gyro 135 through crank 136 attached to shaft 134, dashpot 137 and arm 138. The torque on the gyro 135 effects a displacement of the armature 140 of an E-type pick-off 141 to thereby produce a signal appearing on leads 142, the signal being applied to the aileron servo amplifier of a servomotor system not shown. Dashpot 137 is so adjusted that the product of the torque times the time through which the torque is acting, is correct to move the aeroplane to an angle of bank which is equal and opposite to the tilt of the platform 43. If the coordination between the platform movement and the magnitude of the signal appearing on lead 42 is correct, the aircraft will settle at the new bank angle with zero error. If, however, an error exists, a signal will be produced by pendulum 46 which is equal to the error and will modify the signal appearing on leads 42 to gradually correct the error by moving the aircraft until the platform is level, or until the error signal produced by pendulum 46 is zero.

The elevator is similarly controlled. Pulling back the control handle 31 causes platform 43 to be tilted forwardly through flexible shaft 122 and at the same time a torque is applied to the rate of climb gyro 143 through crank 144, dashpot 145 and arm 146, as in the case of the banking turn. The torque on the rate of climb gyro displaces the armature 147 of the "E" pick-off 148 to produce a signal in leads 149 proportional to the displacement of the armature 147. Dashpot 145 is exactly the same as dashpot 137 and is adjusted so that the product of a torque times the time through which the torque is acting is correct to move the aircraft to an angle of elevation equal and opposite to the angle of tilt of the platform 43. Again, as in the case of banking, pitch pendulum 45 will detect any error between the craft and platform and will apply a signal proportional to the error to modify the signal in leads 149 to increase or decrease the angle of elevation of the craft to correspond to the angle of tilt of the platform 43.

Since the rate of turn gyro 130 is stabilized, integration of its signal will give true heading. Thus, the signal from the rate of turn gyro can be applied to a motor 150 (preferably with speed feed back as shown in Fig. 2) to move a compass card 151. During straight level flight the motor 150 is driven from the output of the flux valve 152 to give proper heading reading on compass card 151. During turns, however, the signal from the rate of turn gyro 130 is applied to a relay 153 which cuts out the flux valve signal and switches in the rate of turn signal to the motor 150 and the phase winding 129 of the compensator torquer 128.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic flight control system for aircraft having control surfaces for moving the craft about its primary axes, a pitch and roll reference apparatus, a control handle including means for producing control signals dependent on movement thereof, a first pair of servo loops each comprising a first servomotor connected to operate respective control surfaces, control means for said first servomotors responsive to said control signals, a second pair of servo loops each comprising a second servomotor connected to position said pitch and roll reference apparatus respectively in accordance with said control signals, said two pairs of servo loops being operable respectively to move said craft in one direction about said axes and said pitch and roll reference apparatus in an equal but opposite direction, whereby said pitch and roll reference apparatus will be maintained in a substantially fixed plane in space.

2. In an automatic flight control system for aircraft having control surfaces for moving the craft about its primary axes, a pitch and roll reference apparatus, a manual control handle, signal generator means coupled with said control handle for producing signals dependent on movements thereof, a first pair of servo loops each comprising a first servomotor connected to operate respective control surfaces, first control means for said first servomotors responsive to said generator signals, a second pair of servo loops each comprising a second servomotor connected to position said pitch and roll reference apparatus about respective craft axes, second control means for said second servomotors responsive to said generator signals, said first and second pairs of servo loops being operable respectively to move said craft about said axes in one direction and said pitch and roll reference apparatus about said axes in an equal but opposite direction, whereby said pitch and roll reference apparatus will be maintained in a substantially fixed plane in space.

3. In an automatic flight control system for aircraft having control surfaces for moving said craft about its primary axes, a pitch and roll reference apparatus, a manual control handle mounted for movement about mutually perpendicular axes, signal voltage generator means coupled with said control handle for producing signal voltages dependent on movements thereof, a first pair of servo loops each comprising a first servomotor connected to operate respective control surfaces, first control means for said first servomotors responsive to said signal voltages, a second pair of servo loops each comprising a second servomotor connected to position said pitch and roll reference apparatus about respective craft axes, second control means for said second servomotors responsive to said signal voltages, said first and second pairs of servo loops being operable repectively to rotate the craft through angles about said axes in one direction and said pitch and roll reference apparatus through equal angles about said axes but in opposite directions whereby said pitch and roll reference apparatus is maintained in a substantially fixed plane in space.

4. In an automatic flight control system for aircraft having control surfaces for moving said craft about its primary axes, a pitch and roll reference apparatus, a manual control handle, signal generator means associated with said control handle for producing a first signal voltage proportional to the rate of movement thereof, means for providing a second signal proportional to a time integral of said first signal, a first pair of servo loops each comprising a servomotor connected to operate respective control surfaces, control means for said first servomotors responsive to said second signal, a second pair of servo loops each comprising a second servomotor connected to position said pitch and roll reference apparatus respectively, control means for said second servomotors responsive to said first signal voltage, said two pairs of servo loops being operable respectively to move said craft about said axes in one direction and said pitch and roll reference apparatus in an equal but opposite direction, whereby said pitch and roll reference apparatus will be maintained in a substantially fixed, horizontal plane in space.

5. In an automatic pilot for aircraft having control surfaces for moving said craft about its primary axes, an attitude reference apparatus, a manual control handle for operating first and second signal generator means, said first generator means producing control signals proportional to the rate of movement of said control handle and said second generator means producing control signals proportional to the displacement of said control handle from a neutral position, a first pair of servo loops each comprising a first servomotor connected to operate respective control surfaces, control means for said first servomotors responsive to said rate signals, a second pair of servo loops each comprising a second servomotor for positioning said reference apparatus respectively, control means for said second servomotors responsive to said displacement signals, said first and second pairs of servo loops being responsive to said rate and displacement signals respectively so as to move said craft about said axes in one direction and said pitch and roll reference apparatus about said axes in an equal and opposite direction whereby said attitude reference apparatus will be rotated about said axes through angles equal and opposite to the angles through which said craft is rotated thereby maintaining said attitude reference apparatus in a substantially horizontal plane in space.

6. In an automatic flight control system for aircraft having control surfaces for moving the craft about its primary axes, a pitch and roll reference apparatus, a control handle, signal voltage generator means operated thereby, said generator means being connected to produce control signals proportional to the rate of movement of said control handle, a first pair of servo loops each comprising a first servomotor connected to operate respective control surfaces, rate gyros responsive to said control signals, means responsive to movement of said rate gyros for controlling said first servomotors respectively, a second pair of servo loops each comprising a second servomotor connected to position said pitch and roll reference apparatus respectively, control means for said second servomotors responsive to said control signals, said first servomotors being adapted respectively to produce rotation of said craft about said axes through angles proportional to the magnitude and direction of said control signals and said second servomotors being adapted respectively to produce rotation of said pitch and roll reference apparatus about said axes through angles equal in magnitude and opposite in direction, whereby said pitch and roll reference apparatus will be maintained in a substantially level plane in space.

7. In an automatic pilot for aircraft having control surfaces for moving said craft about its primary axes, an attitude reference member, a manual control handle including means for producing control signals dependent on movement thereof, a first pair of servo loops each comprising a first servomotor connected to operate said control surfaces, control means for respective servomotors responsive to said control signals, a second pair of servo loops each comprising a second servomotor responsive to said control signals connected respectively to position said member, said first and second pairs of servo loops being operable respectively to move said craft in one direction about said axes and said member in an equal but opposite direction, whereby said member will be maintained in a substantially level plane in space.

8. In an automatic pilot for aircraft having control surfaces for moving the craft about its primary axes, a support for pitch and roll reference members, said support being journaled to rotate about the pitch and roll axes of said craft, pick-off means associated with said pitch and roll reference members for producing signals dependent upon angular displacement of said support from a fixed plane and space, a control handle including means for producing control signals dependent on movement thereof, a first pair of servo loops each comprising a first servomotor connected to operate respective control surfaces, a control means for said servomotors responsive to said control signals, said control means being further responsive to said pick-off signals, a second pair of servo loops each comprising a second servomotor responsive to said control signals connected respectively to position said support, said two pairs of servo loops being operable respectively to rotate said craft about said axes in one direction and said support in an equal but opposite direction, whereby said support will be maintained in a substantially level plane in space, and said pick-off signals being operable to modify the operation of said first pair of servomotors to maintain the craft in the attitude determined by the attitude of said support.

9. In an automatic pilot for aircraft having control surfaces for moving the craft about its primary axes, a support for pitch and roll reference member, said support being journaled to rotate about the pitch and roll axes of said craft, pick-off means associated with said pitch and roll reference members for producing signals dependent upon angular displacement of said support from a fixed plane and space, an azimuthal reference mounted for rotation on said support, pick-off means associated therewith for producing signals dependent upon angular displacement from a predetermined azimuthal direction, a control handle including means for producing control signals dependent on movement thereof, a first pair of servo loops each comprising a first servomotor connected to operate respective control surfaces, control means for said servomotors responsive to said control signals, said control means being further responsive to said pick-off signals, a second pair of servo loops each comprising a second servomotor responsive to said control signals connected respectively to position said support, said two pairs of servo loops being operable respectively to rotate said craft about said axes through angles about said axes in one direction and to rotate said support through equal angles about said axes but in opposite directions, whereby said support will be maintained in a substantially level plane in space, and said pick-off signals being connected to modify the operation of said first pair of servomotors to maintain the craft in the attitude determined by the attitude of said support.

10. In an automatic pilot for aircraft having control surfaces for moving said craft about its primary axes, a support for pitch and roll reference members, said support being journaled to rotate about the pitch and roll axes of said craft, a manual control handle including means for producing control signals dependent on movement thereof, a first pair of servo loops each comprising a first servomotor connected to operate respective control surfaces, control means for said servomotors responsive to said control signals, means for modifying said control signals in proportion to movement of said support about the craft pitch and roll axes, a second pair of servo loops each comprising a second servomotor responsive to said control signals connected respectively to position said support, said first and second pairs of servo loops being operable respectively to move said craft through angles about said axes in one direction and said support through equal angles but in opposite directions, whereby said support will be maintained in a substantially level plane in space.

11. In an automatic pilot for aircraft having control surfaces for moving the craft about its primary axes, a support member journaled to rotate about the pitch and roll axes of said craft, a gyro pendulum mounted in said support, pick-off means associated with said gyro pendulum for producing signals dependent on angular displacement of said support from a fixed plane in space, a control handle including means for producing control signals dependent on movement thereof, a first pair of servo loops each comprising a first servomotor connected to operate respective control surfaces, control means for said servomotors responsive to said control signals, said control means being further responsive to said pick-off signals, a second pair of servo loops each comprising a second servomotor responsive to said control signals and connected respectively to position said support, said two pairs of servo loops being operable respectively to rotate said craft through angles about said axes in one direction and to rotate said support through equal angles about said axes but in opposite directions, whereby said support will be maintained in a substantially level plane in space, and said pick-off signals being connected to modify the operation of said first servomotor whereby to maintain the craft in the attitude determined by the attitude of said support.

12. In an automatic flight control system for aircraft, a pitch and roll reference apparatus having signal outputs proportional to angle of pitch error and angle of roll error, a control handle including means for producing control signals dependent on movement thereof, means for driving said reference apparatus in response to said control signals, means for controlling said driving means to vary the lag of the reference apparatus movement behind movement of the control handle in accordance with the magnitude of the error signals from said reference apparatus.

13. In an automatic flight control system for aircraft having control surfaces for moving said craft about its primary axes, servo means for moving said control surfaces, a support member, means for mounting said member for rotation about the pitch and roll axes of said craft, pendulous means on said support member for providing signals proportional to the angle of roll error and the angle of pitch error, a control handle, means associated with said control handle for moving said support member about said axes equally and oppositely to movements of said control handle, means including a rate of pitch gyro and a rate of roll gyro for providing control signals for controlling said servo means, means responsive to movement of said control handle for controlling said gyro means, and means for modifying said control signals by said error signals.

14. In an automatic flight control system for aircraft, a platform member, means for universally supporting said platform member for rotation about the craft axis of pitch and axis of roll, a control handle, means connecting said control handle and said platform for moving the latter in a direction about said axes equal and opposite to desired craft movement, a rate of turn gyro on said platform, signal producing means associated with said rate gyro for producing a signal proportional to the azimuthal rate of turn of said craft.

15. In an automatic flight control system for aircraft, a control handle arranged to be displaced about a craft control axis from a predetermined neutral position, means for producing a signal proportional to the rate of displacement of said handle, integrating means including a craft reference gyro for producing a signal proportional to the integral of said rate of displacement signal, and means for controlling craft position about said predetermined craft control axis by said integrated signal, whereby to produce an angular craft displacement proportional to the displacement of said control handle about said craft control axis.

16. In an automatic flight control system for aircraft having control surfaces for moving the craft about its primary axes, an attitude reference apparatus supported on said craft, a control handle, means coupling said control handle with said control surfaces and separate means coupling said control handle with said reference apparatus for moving both in accordance with movements of said control handle, said coupling means being adapted to move said control surfaces such that the craft will rotate in one direction while said reference apparatus will experience an angular rotation through an equal angle but in an opposite direction relative to said craft, whereby said reference apparatus will be maintained substantially in a fixed plane in space.

17. In an automatic flight control system for aircraft having a control surface for moving the craft about an axis, a reference apparatus supported on said craft, a control handle, means coupling said control handle with said control surface and separate means coupling said control handle with said reference apparatus for effecting movement of both craft and reference apparatus in accordance with movements of said control handle, said coupling means being adapted to move said control surface such that the craft will rotate in one direction about said axis while said reference apparatus will experience an angular rotation through an equal angle but in an opposite direction relative to said craft, whereby said reference apparatus will be maintained substantially in a fixed plane in space.

18. In an automatic flight control system for aircraft having a control surface for moving said craft about an axis thereof, attitude reference apparatus supported on said craft, a manual control handle, signal voltage generator means coupled with said control handle for producing a signal proportional to the rate of movement thereof, means for providing a second signal proportional to a time integral of said first signal, a first servo loop comprising a servomotor connected to operate said control surface to thereby move said craft about said axis, control means for said first servomotor responsive to said second signal, a second servo loop comprising a second servomotor connected to position said reference apparatus, control means for said second servomotor responsive to said first signal, said servo loops being operable respectively to move said craft about said axis in one direction and said reference apparatus in an equal extent but in the opposite direction about said axis, whereby said reference apparatus will be maintained in a substantially fixed horizontal plane in space.

19. In an automatic pilot for aircraft having a control surface for moving said craft about an axis thereof, a reference apparatus supported on said craft, a manual control handle, first and second signal generator means coupled with said control handle for producing control signals proportional respectively to the rate of movement of said control handle and the displacement of said control handle from a neutral position, a first servo loop comprising a first servomotor connected to operate said control surface to thereby rotate said craft about said axis, control means for said first servomotor responsive to said rate signal, a second servo loop comprising a second servomotor for positioning said reference apparatus about said axis, control means for said second servomotor responsive to said displacement signal, said first and second servo loops being operable respectively to move said craft about said axis in one direction and said reference apparatus about said axis in an equal but opposite direction, whereby said reference apparatus will be rotated about said axis through angles equal and opposite to the angles through which the craft is rotated thereby maintaining said reference apparatus in a substantially horizontal plane in space.

20. In a flight control system for aircraft, a control handle arranged to be displaced about an axis from a predetermined neutral position, means for producing a first signal proportional to the rate of displacement of said handle, and means including a craft attitude reference device and means responsive to said first signal for producing a control signal proportional to the displacement of said handle, and means responsive to said control signal for controlling craft position about a predetermined craft axis so as to produce an angular craft displacement about said craft axis proportional to the displacement of said control handle about its axis.

JOHN M. SLATER.

REFERENCES CITED

The following references are of record in the file of this patent:

UNITED STATES PATENTS

| Number | Name | Date |
|---|---|---|
| 2,005,530 | Boykow | June 18, 1935 |
| 2,270,875 | Hanson et al. | Jan. 27, 1942 |
| 2,286,561 | Meredith | June 16, 1942 |
| 2,307,941 | Meredith | Jan. 12, 1943 |
| 2,503,346 | Meredith | Apr. 11, 1950 |
| 2,516,641 | Murphy | July 25, 1950 |

FOREIGN PATENTS

| Number | Country | Date |
|---|---|---|
| 611,008 | Great Britain | Oct. 25, 1948 |